US012471188B2

(12) United States Patent
Pop et al.

(10) Patent No.: US 12,471,188 B2
(45) Date of Patent: Nov. 11, 2025

(54) CONFORMING HEATING PAD

(71) Applicant: Sunbeam Products, Inc., Atlanta, GA (US)

(72) Inventors: Sergiu Mihail Pop, Lake Worth, FL (US); Matthew Allen Johnson, South Haven, MI (US)

(73) Assignee: Sunbeam Products, Inc., Atlanta, GA (US)

( * ) Notice: Subject to any disclaimer, the term of this patent is extended or adjusted under 35 U.S.C. 154(b) by 0 days.

(21) Appl. No.: 18/392,665

(22) Filed: Dec. 21, 2023

(65) Prior Publication Data

US 2024/0130009 A1 Apr. 18, 2024

Related U.S. Application Data

(63) Continuation of application No. 16/903,650, filed on Jun. 17, 2020, now abandoned.
(Continued)

(51) Int. Cl.
H05B 3/34 (2006.01)
A61F 7/08 (2006.01)

(52) U.S. Cl.
CPC .............. *H05B 3/342* (2013.01); *A61F 7/08* (2013.01); *H05B 2203/002* (2013.01)

(58) Field of Classification Search
CPC ...... A61F 7/08; H05B 3/342; H05B 2203/002
See application file for complete search history.

(56) References Cited

U.S. PATENT DOCUMENTS 5,366,491 A * 11/1994 Ingram ..................... A61F 7/02
607/108
5,728,146 A 3/1998 Burkett et al.
(Continued)

FOREIGN PATENT DOCUMENTS

CN 201591673 U 9/2010
CN 201967159 U 9/2011
(Continued)

OTHER PUBLICATIONS

Decision of Rejection for Chinese Patent Application No. 2020105583929, dated Aug. 31, 2024, 14 pages (including Statement of Relevance).

*Primary Examiner* — Steven W Crabb
*Assistant Examiner* — Dilnessa B Belay
(74) *Attorney, Agent, or Firm* — Husch Blackwell LLP

(57) ABSTRACT

The present disclosure is directed to a heating pad that conforms to body parts of a user. The conforming heating pad can be worn to provide heat relief on different parts of a user's body. In an embodiment, a conforming heating pad includes a first layer on a posterior side of the heating pad, a second layer, a third layer, and a fourth layer on an anterior side of the heating pad. A continuous heating element is distributed throughout the second layer. The continuous heating element is capable of being selectively heated to increase the temperature of the heating pad. The third layer has a plurality of cavities formed in it. Each cavity holds a plurality of beads. When the heating pad is applied to a body portion of a user, the weight of the beads applies a force against the conductive heating element, the second layer, and the first layer to thereby conform them to the body portion of the user.

20 Claims, 3 Drawing Sheets

Related U.S. Application Data

(60) Provisional application No. 62/863,073, filed on Jun. 18, 2019.

(56) References Cited

U.S. PATENT DOCUMENTS

| | | | | | |
|---|---|---|---|---|---|
| 2004/0149711 | A1* | 8/2004 | Wyatt | ............... | A61F 7/007 |
| | | | | | 219/217 |
| 2007/0055330 | A1* | 3/2007 | Rutherford | ............ | A61F 7/007 |
| | | | | | 607/114 |
| 2009/0032523 | A1* | 2/2009 | Youngblood | ............ | H05B 3/36 |
| | | | | | 219/528 |
| 2014/0302970 | A1* | 10/2014 | Sinclair | ............... | A63B 21/065 |
| | | | | | 482/105 |
| 2020/0171268 | A1* | 6/2020 | Zhang | ............... | A47G 9/1036 |

FOREIGN PATENT DOCUMENTS

| | | | | |
|---|---|---|---|---|
| CN | 202043918 U | | 11/2011 | |
| CN | 202776709 U | | 3/2013 | |
| CN | 106666851 A | | 5/2017 | |
| CN | 109495996 A | | 3/2019 | |
| KR | 200389046 Y1 * | | 4/2005 | ............... A47G 9/10 |

\* cited by examiner

CONFORMING HEATING PAD

CROSS-REFERENCE TO RELATED APPLICATIONS

This Application is a continuation application of U.S. application Ser. No. 16/903,650, filed on Jun. 17, 2020, which claims priority to U.S. Provisional Patent Application Ser. No. 62/863,073, filed on Jun. 18, 2019, entitled "CONFORMING HEATING PAD", the entire disclosure of both of which are incorporated herein by reference.

FIELD OF INVENTION

This invention relates generally to heating pads, and more particularly, to a flexible heating pad that conforms to body parts of a wearer.

BACKGROUND OF INVENTION

Clinical studies have shown that the application of heat can provide relief for muscle and joint pain. Current heating pads are stiff and rigid, which prevents them from conforming to certain body parts.

For example, current rigid heating pads are unable to contour to curved and complex body parts, such as a shoulder, a knee, an elbow, an ankle, or a foot. The inability of current heating pads to conform to certain body parts impedes proper heat transfer contact to a user when placing the current heating pad, especially on the certain, complex body parts.

SUMMARY OF THE INVENTION

The present invention is directed to a heating mechanism that conforms to body portions of a user. In an embodiment, a heating pad includes a first layer on a posterior side of the heating pad. It further may include a second layer, a third layer, and a fourth layer on an anterior side of the heating pad. A continuous heating element is distributed throughout the second layer. The continuous heating element is capable of being selectively heated to increase the temperature of the heating pad. The third layer has a plurality of cavities formed in it. Each cavity holds a plurality of beads. When the heating pad is applied to a body portion of a user, the weight of the beads applies a force against the conductive heating element, the second layer, and the first layer to thereby conform them to the body portion of the user.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

Figure 1:
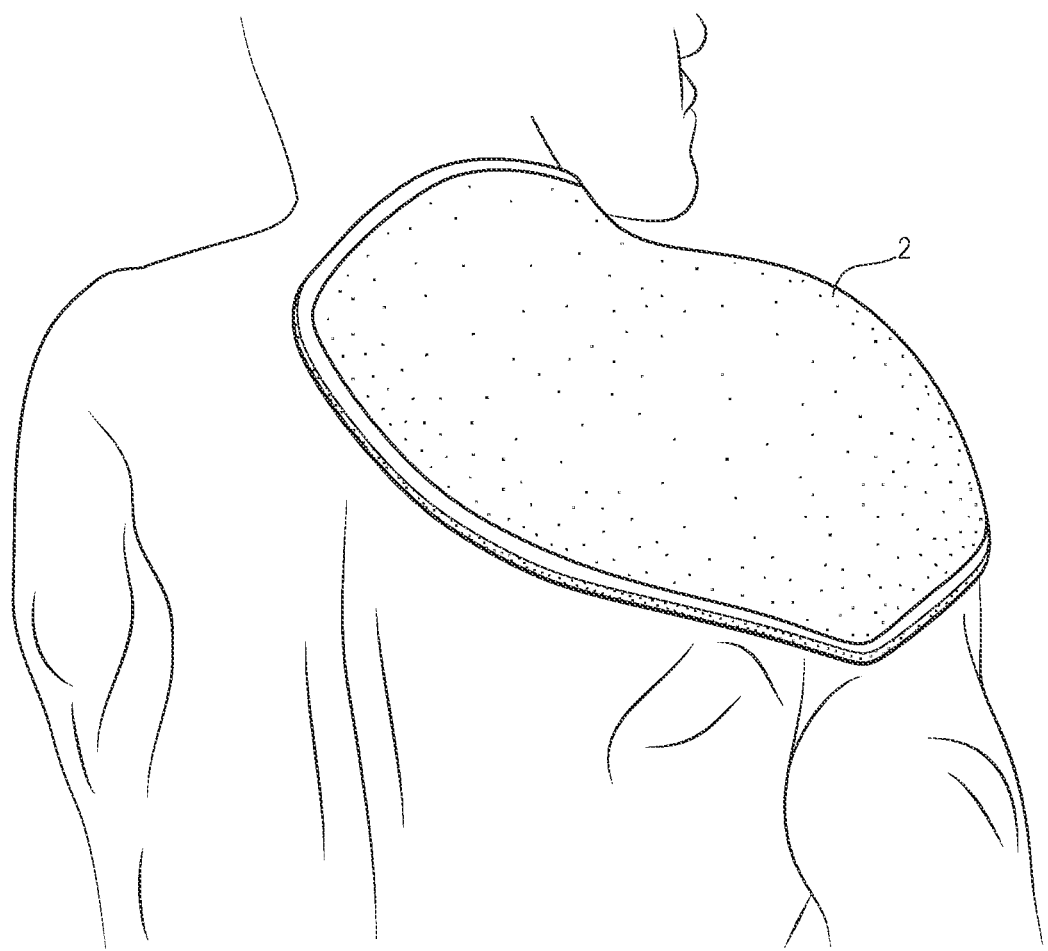
FIG. 1 depicts a perspective view of the conforming heating pad conforming to a shoulder, upper back, and neck portion of a user.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiments disclosed, but on the contrary, the intention is to cover all modifications, equivalents, and alternatives falling within the spirit and scope of the present disclosure.

DETAILED DESCRIPTION OF THE INVENTION

The present disclosure is directed to a conforming heating pad having improved flexibility and conformability to body parts. The conforming heating pad utilizes a unique heating wire pattern, reduced pad materials, a lightly weighted layer of (e.g., glass) beads, and outer layers comprised of soft, flexible materials. The conforming heating pad of the present disclosure easily flexes to contour to the shape of any body part for more effective pain relief (relative to conventional heating pads) by creating more contact points to the user's body and ensuring better heat transfer. The conforming heating pad described herein can use an electrical power source (e.g., alternating current power, a battery, USB power source, etc.) to provide electric current to a heating wire distributed throughout a layer of the conforming heating pad.

The present disclosure will now be described with reference to the drawing figures, in which like reference numerals refer to like parts throughout. For purposes of clarity in illustrating the characteristics of the present disclosure, proportional relationships of the elements have not necessarily been maintained in the drawing figures.

Figure 2:
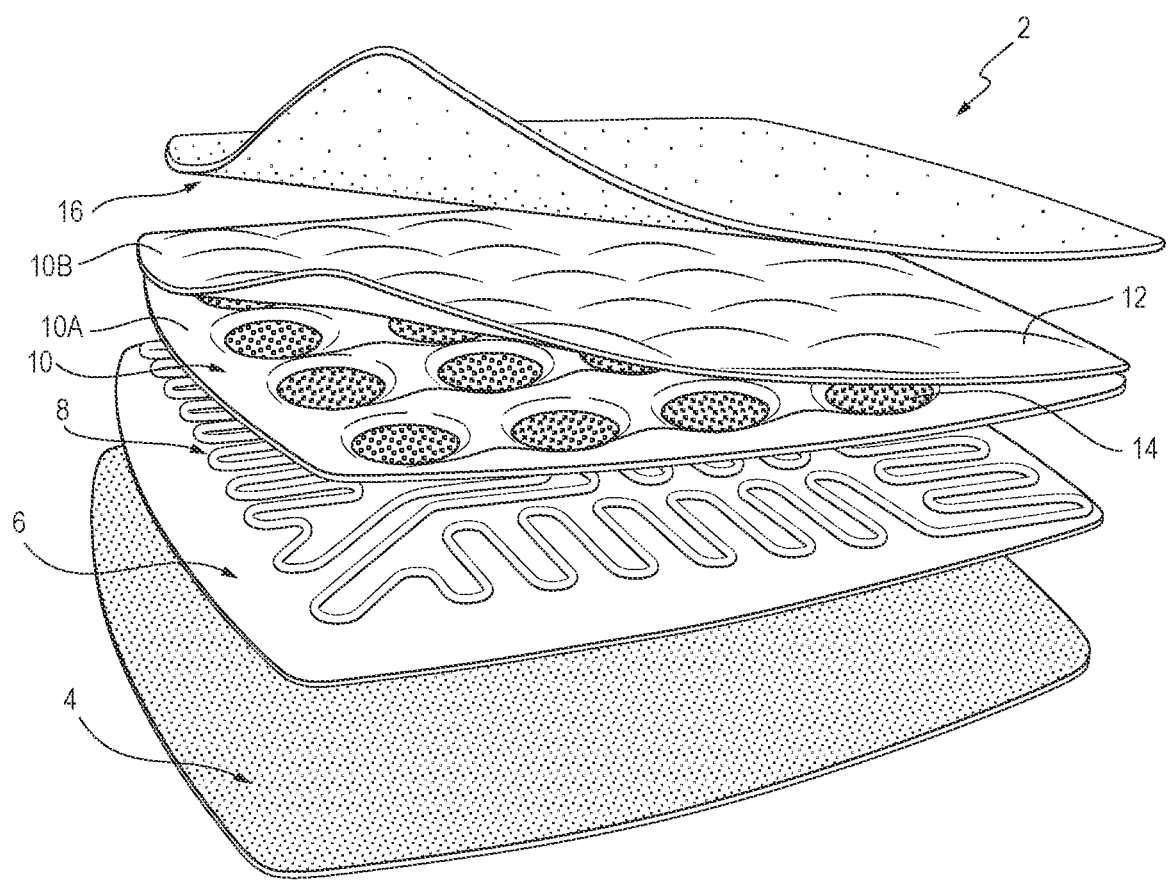
FIG. 2 depicts an exploded view of the conforming heating pad.
Figure 3:
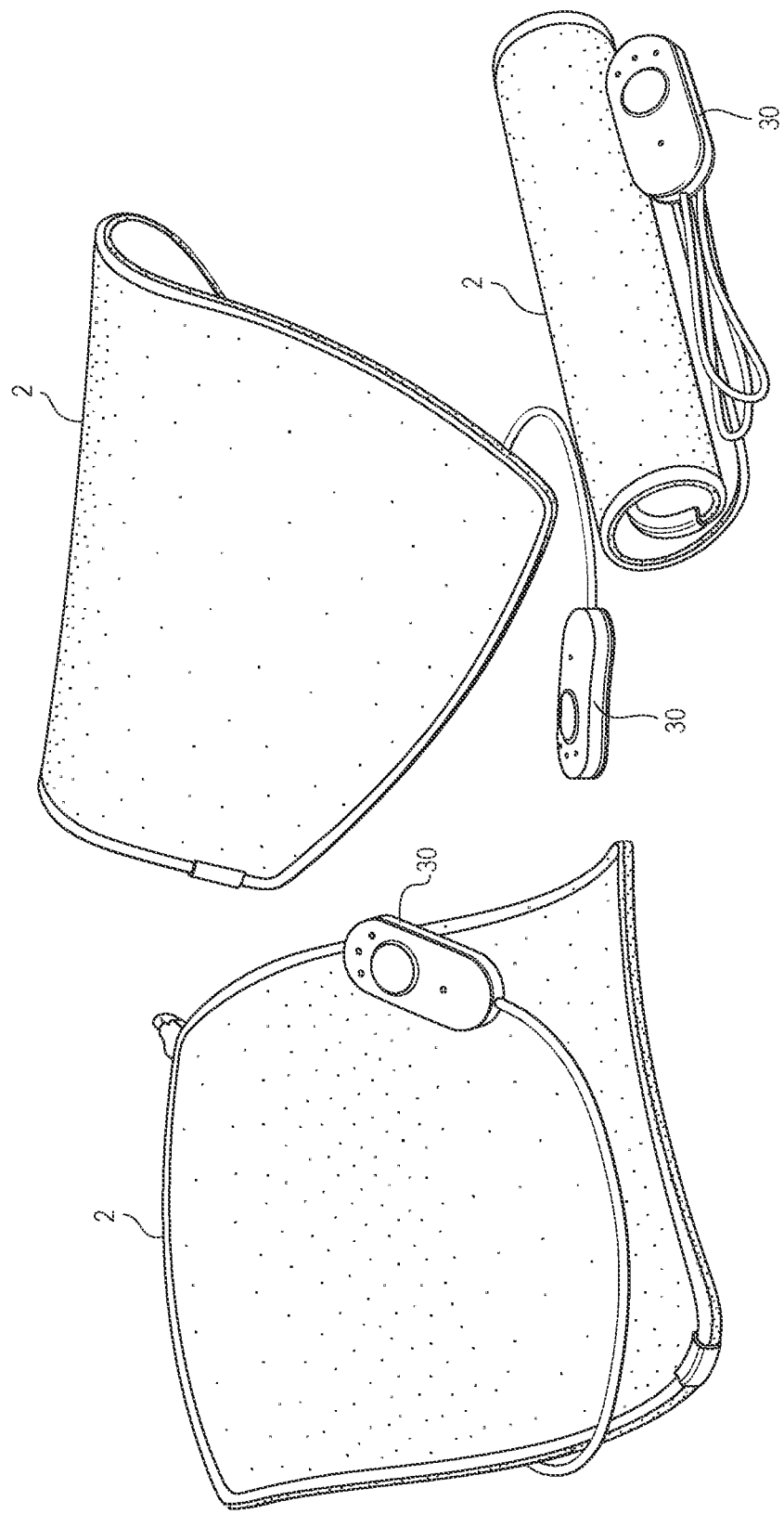
FIG. 3 depicts contoured states of the conforming heating pad and a controller of the conforming heating pad.

The present disclosure is directed to a conforming heating pad 2. Referring now to the drawing figures in which like reference designators refer to like elements, there is shown in FIGS. 1-3 views of an example embodiment of the conforming heating pad 2 in accordance with the present disclosure. FIG. 1 illustrates the conforming heating pad 2 conforming to a shoulder, upper back, and neck portion of a user. As illustrated in FIG. 1, the conforming heating pad 2 flexes to contour to the shape of the shoulder, upper back, and neck portion of the user's body for more effective pain relief (relative to conventional heating pads) by creating more contact points to the user's body and thus ensuring better heat transfer.

In an example embodiment, the conforming heating pad 2 may be a planar rectangular member. The conforming heating pad 2 preferably includes at least four flexible layers. The layers preferably help allow the heating pad 2 to conform to the part of the user's body onto which the conforming heating pad 2 is placed. In a first embodiment and as shown in FIG. 2, the layers of the conforming heating pad 2 include a first layer 4 that covers a posterior side of the conforming heating pad 2 and is positioned adjacent to the user when the conforming heating pad 2 is worn. The first layer 4 is the layer that comes into contact with the user's skin or clothing and preferably provides a comfortable surface that does not irritate the skin of the user when the conforming heating pad 2 is worn and is also able to transfer heat. The first layer 4 may be comprised of a single-sided fabric including soft, velvet-like fibers (e.g., Microplush® fabric, etc.) in some embodiments.

The conforming heating pad 2 preferably further includes a second layer 6 anterior to the first layer 4 which provides a surface on which a conductive heating element 8 may be attached. The second layer 6 may be comprised of a flexible material, such as nylon, for example. The conductive heating element 8 is distributed throughout the length and width of the conforming heating pad 2. In an embodiment, the conductive heating element 8 is distributed throughout the conforming heating pad 2 in a serpentine-like pattern as illustrated in FIG. 2. In some embodiments, the conductive heating element 8 is attached to the second layer 6 by threads or the like. The conductive heating element 8 is electrically coupled to one or more heating element connectors for connecting the conductive heating element 8 to an electrical connector. The electrical connector is in turn connected to an electric controller and/or electric power source, as will be explained in more detail hereinafter. The conductive heating element 8 can be in the form of a conductive wire or conductive thread. For example, the conductive heating element 8 may be comprised of a thin copper wire. However, it will be appreciated by persons skilled in the art that the conductive heating element 8 can be comprised of any material that conducts electric current but also has electrical resistivity such that the electric current is at least partially converted to heat energy when flowing through the conductive heating element 8. In some embodiments, the conductive heating element 8 is electrically insulated with an insulating material (e.g., a sheath, jacket, etc.) that prevents electric current from flowing from the conductive heating element 8 to other components of the conforming heating pad 2 but also conducts heat energy generated by the conductive heating element 8 to other components of the conforming heating pad 2 and/or portions of the user's body.

The conforming heating pad 2 further includes a third layer 10 that is anterior relative to each of the layers 4, 6. The second layer 6 and the conductive heating element 8 are therefore located and positioned in between the first layer 4 and the third layer 10. The third layer 10 includes a posterior third layer 10A and an anterior third layer 10B that each have one or more dimples 12 formed therein. The posterior third layer 10A and the anterior third layer 10B may be comprised of a flexible material, such as polyester fabric (e.g., high density polyester fabric), for example. When the posterior third layer 10A and the anterior third layer 10B are arranged adjacent to each other, the dimples 12 of each layer are aligned such that two opposing dimples 12 (i.e., a dimple 12 of the posterior third layer 10A and a dimple 12 of the anterior third layer 10B) form a cavity configured to hold beads 14. The beads 14 may be comprised of glass, ceramic, or the like. In some embodiments, the dimples 12 are formed in the posterior third layer 10A and the anterior third layer 10B in a grid pattern (e.g., a 5×5 grid, etc.) such that the beads 14, and thus the weight of the beads 14, are evenly distributed throughout the third layer 10.

When the conforming heating pad 2 is placed on a body portion of a user, the weight of the beads 14 applies a force against the conductive heating element 8, the second layer 6, and the first layer 4 to help conform them to the wearer's body portion. This preferably keep the conforming heating pad 2 in place and snug against the wearer's body portion. In some embodiments, the size of the beads 14 is fine (e.g., within a range of about 0.8 millimeters in diameter to about 1.5 millimeters in diameter, etc.), and the beads 14 may have a high density and smooth surfaces. The high density and smooth shape allow the beads 14 to be very fluid or dynamic when the conforming heating pad 2 is moved or re-arranged on a body portion of the user. In some embodiments, beads 14 act as a thermal insulator, which helps increase heat retention properties of the conforming heating pad 2.

As illustrated, the conforming heating pad 2 further includes a fourth layer 16 that is anterior to all of the layers 4, 6, 10. The third layer 10 and the beads 14 are therefore located and positioned in between the second layer 6 and the fourth layer 16. The fourth layer 16 may be comprised of a fleece material, for example. The visible outer layers of the conforming heating pad 2 include the first layer 4 and the fourth layer 16, where only the fourth layer 16 is visible when the conforming heating pad 2 is worn.

As illustrated in FIG. 3, the conforming heating pad 2 can be rolled up (e.g., for storage purposes, etc.). An electric controller 30 is selectively connectable to the conductive heating element 8, such that when an electric current is supplied from the electric controller 30 through the conductive heating element 8, heat is produced. The produced heat is transferable from the conductive heating element 8 through the second layer 6 and the first layer 4 to the portion of the user's body upon which the conforming heating pad 2 is placed/secured. The electric controller 30 includes control circuitry for controlling an operational status of the conforming heating pad 2 and/or the flow of electrical current through the conductive heating element 8. For example, the electric controller 30 may include at least one selection mechanism and one or more indicators. The at least one selection mechanism can enable a human user to select (e.g., push, turn, etc.) the selection mechanism to turn the power on or off and/or to adjust the temperature setting of the electric controller 30 until the desired heat setting (e.g., low, medium, high, etc.) has been reached. The one or more indicators can indicate the status of the conductive heating element 8, on or off, or a temperature setting of the conforming heating pad 2. The electric controller 30 may include a housing that can be any shape and size as long as it is able to surround the electronics and circuitry components of the controller 30. In one embodiment, the one or more indicators of the controller 30 may be visual indicators in the form of one or more light-emitting diode (LED) lights that preferably will indicate whether the controller 30 has power and/or its temperature setting. In one embodiment, a series of three LED lights may turn on or change different colors, notifying the user of the selected pre-determined temperature setting. In the same or another embodiment, another LED light may turn on or change different colors, notifying the user of the operational state (e.g., on or off) of the electric controller 30.

In certain embodiments, the conforming heating pad 2 described herein provides a high (e.g., about 145 degrees Fahrenheit) level of heat, a quick (e.g., a high heat-up time of about 15 minutes, but the user can feel the heat in about 30 seconds) heat-up time (e.g., via XpressHeat™ heating pad technology), extreme flexibility compared to current heating pad construction, a weighted bead layer to assist with conformability to body portions of a user, and/or multiple heat settings. In some embodiments, the conforming heating pad 2 is washable. The contouring pad profile of the conforming heating pad 2 creates better contact points between the conductive heating element 8 and body portions of a user, which provides enhanced heat transfer for more effective pain relief compared to current heating pads.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A heating pad comprising:
a first layer on a posterior side of the heating pad;
a second layer having a conductive heating element distributed throughout the second layer, wherein the conductive heating element is selectively heated to increase the temperature of the heating pad;
a third layer having a posterior layer, an anterior layer, and a plurality of beads, wherein the posterior layer and the anterior layer include dimples formed therein and spaces between the dimples, with respective dimples and respective spaces of the posterior portion and the anterior portion being aligned, wherein alignment of the respective dimples form a plurality of cavities configured to hold the plurality of beads, and wherein each cavity of the plurality of cavities holds a respective bead of the plurality of beads, such that the beads, and thus the weight of the beads, are evenly distributed throughout the third layer, wherein the plurality of cavities are arranged in a grid pattern with a plurality of columns and a plurality of rows, and wherein each of the plurality of cavities are separated from one another by the aligned respective spaces; and
a fourth layer on an anterior side of the heating pad; and
wherein when the heating pad is applied to a body portion of a user, the weight of the beads applies a force against the conductive heating element, the second layer, and the first layer to thereby conform them to a body portion of a user of the heating pad; and
wherein, when the heating pad is assembled, a portion of each of the plurality of cavities is at least partially positioned over and on top of the heating element.

2. The heating pad of claim 1, wherein the first layer is comprised of a single-sided fabric.

3. The heating pad of claim 1, wherein the second layer is comprised of a nylon material.

4. The heating pad of claim 1, wherein the third layer is comprised of a polyester fabric.

5. The heating pad of claim 1, wherein the fourth layer is comprised of a fleece material.

6. The heating pad of claim 1, wherein each of the plurality of columns includes at least five cavities, and wherein each of the plurality of rows includes at least five cavities.

7. The heating pad of claim 1, wherein the at least one bead is comprised of at least one of glass and ceramic.

8. The heating pad of claim 1, wherein each cavity is formed by a opposite-facing dimples of the posterior and anterior layer.

9. The heating pad of claim 1, wherein the conductive heating element is surrounded by an insulative material.

10. The heating pad of claim 1, wherein a controller is provided in electronic communication with the conductive heating element.

11. A heating pad comprising:
a first layer on a posterior side of the heating pad;
a second layer having a conductive heating element distributed throughout the second layer, wherein the conductive heating element is capable of being selectively heated to increase the temperature of the heating pad;
a third layer having an anterior layer, a posterior layer, and a plurality of beads contained within a plurality of cavities, wherein each cavity of the plurality of cavities is formed by alignment of opposite-facing dimples in the anterior and posterior layer with spaces between the dimples, and wherein the respective dimples and respective spaces are aligned, and wherein the beads, and thus the weight of the beads, are evenly distributed throughout the third layer, wherein the plurality of cavities are arranged in a grid pattern with a plurality of columns and a plurality of rows, and wherein each of the plurality of cavities are separated from one another by the aligned respective spaces; and
a fourth layer on an anterior side of the heating pad; and
wherein when the heating pad is applied to a body portion of a user, the weight of the beads applies a force against the conductive heating element, the second layer, and the first layer to thereby conform them to a body portion of a user of the heating pad.

12. The heating pad of claim 11, wherein the first layer is comprised of a single-sided fabric.

13. The heating pad of claim 11, wherein the second layer is comprised of a nylon material.

14. The heating pad of claim 11, wherein the third layer is comprised of a polyester fabric.

15. The heating pad of claim 11, wherein the fourth layer is comprised of a fleece material.

16. The heating pad of claim 11, wherein each cavity of the plurality of cavities holds a respective bead of the plurality of beads.

17. The heating pad of claim 16, wherein each of the plurality of columns includes at least five cavities, and wherein each of the plurality of rows includes at least five cavities.

18. The heating pad of claim 11, wherein the plurality of beads is comprised of at least one of glass and ceramic.

19. The heating pad of claim 11, wherein the conductive heating element is surrounded by an insulative material.

20. The heating pad of claim 11, wherein the plurality of beads each have a diameter from 0.8 mm to 1.5 mm.

* * * * *